(12) United States Patent
Kitamura et al.

(10) Patent No.: US 10,711,975 B2
(45) Date of Patent: Jul. 14, 2020

(54) LIGHT EMITTING ELEMENT, FLUORESCENT LIGHT SOURCE DEVICE

(71) Applicant: USHIO DENKI KABUSHIKI KAISHA, Tokyo (JP)

(72) Inventors: Seiji Kitamura, Tokyo (JP); Masaki Inoue, Tokyo (JP)

(73) Assignee: USHIO DENKI KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/477,797

(22) PCT Filed: Jan. 10, 2018

(86) PCT No.: PCT/JP2018/000289
§ 371 (c)(1),
(2) Date: Jul. 12, 2019

(87) PCT Pub. No.: WO2018/135345
PCT Pub. Date: Jul. 26, 2018

(65) Prior Publication Data
US 2020/0124251 A1    Apr. 23, 2020

(30) Foreign Application Priority Data

Jan. 20, 2017 (JP) ................ 2017-008872

(51) Int. Cl.
*F21V 7/30* (2018.01)
*F21V 7/10* (2006.01)
(Continued)

(52) U.S. Cl.
CPC ............ *F21V 7/30* (2018.02); *C09K 11/7774* (2013.01); *F21V 7/10* (2013.01); *G02B 5/0875* (2013.01); *F21Y 2115/30* (2016.08)

(58) Field of Classification Search
CPC ..................................... F21V 7/30; F21K 9/64
See application file for complete search history.

(56) References Cited

U.S. PATENT DOCUMENTS

2012/0217500 A1    8/2012  Park et al.
2014/0233210 A1*   8/2014  Owada ............... F21V 9/30
                                              362/84

(Continued)

FOREIGN PATENT DOCUMENTS

CN    1493539 A    5/2004
CN    102651402 A    8/2012
(Continued)

OTHER PUBLICATIONS

International Search Report issued in PCT/JP2018/000289; dated Feb. 20, 2018.
(Continued)

*Primary Examiner* — Robert J May
(74) *Attorney, Agent, or Firm* — Studebaker & Brackett PC

(57) ABSTRACT

Provided are a light emitting element capable of maintaining high fluorescent intensity over a long period, and a fluorescent light source device. The light emitting element according to the present invention includes: a substrate; a reflection layer formed of a material containing Ag or Al, formed on the upper layer of the substrate; a diffusion prevention layer formed of a layer at least part of which being crystallized, the diffusion prevention layer being formed in contact with a surface of the reflection layer on a side opposite to the substrate; an enhanced reflection layer formed in contact with a surface of the diffusion prevention layer on a side opposite to the substrate; and a fluorescent body layer formed on the upper layer of the enhanced reflection layer.

15 Claims, 5 Drawing Sheets

(51) Int. Cl.
     *C09K 11/77*      (2006.01)
     *G02B 5/08*       (2006.01)
     *F21Y 115/30*     (2016.01)

(56) References Cited

U.S. PATENT DOCUMENTS

2016/0138766 A1*   5/2016   Owada .................. F21V 29/505
                                                                        362/84
2019/0120442 A1*   4/2019   Okada ....................... F21K 9/64

FOREIGN PATENT DOCUMENTS

| JP | 2015-050124 A | 3/2015 |
|---|---|---|
| WO | 9841480 A1 | 9/1998 |

OTHER PUBLICATIONS

An Office Action dated by the China National Intellectual Property Administration dated Nov. 6, 2019, which corresponds to Chinese Patent Application No. 201880005992.3 and is related to U.S. Appl. No. 16/477,797.

* cited by examiner

Comparative Example 1

Comparative Example 2

LIGHT EMITTING ELEMENT, FLUORESCENT LIGHT SOURCE DEVICE

TECHNICAL FIELD

The present invention relates to a light emitting element including a fluorescent body. Also, the present invention relates to a fluorescent light source device including the light emitting element and an excitation light source, the fluorescent light source device exciting a fluorescent body with excitation light emitted from the excitation light source to radiate fluorescence.

BACKGROUND ART

At present, a fluorescent light source device that excites a fluorescent body with a laser beam and radiates fluorescence emitted from the fluorescent body is known. The following Patent Document 1 discloses a fluorescent light source device in which the surface on which the laser beam enters the fluorescent body and the surface from which fluorescence is extracted from the fluorescent body are configured by the same surface.

PRIOR ART DOCUMENT

Patent Document

Patent Document 1: JP-A-2015-50124

SUMMARY OF THE INVENTION

Problems to be Solved by the Invention

FIG. 9 is a view schematically showing a fluorescent light source device disclosed in Patent Document 1. A fluorescent light source device 100 includes an excitation light source 110 and a light emitting element 120. The light emitting element 120 includes a substrate 121, and a bonding layer 122, a reflection layer 123, an enhanced reflection layer 124, a total reflection layer 125, and a fluorescent body layer 126 formed on the substrate 121.

The fluorescent body layer 126 includes a predetermined fluorescent body, and when excitation light 131 having a predetermined wavelength emitted from the excitation light source 110 is entered, the fluorescent body is excited to generate fluorescence 132 having a longer wavelength than the excitation light. The fluorescence 132 is radiated outside from the surface of the side far from the substrate 121 of the surfaces of the fluorescent body layer 126, namely the surface on which the excitation light 131 is entered. Hereinafter, this surface is called "light extraction surface".

The fluorescence 132 generated in the fluorescent body layer 126 does not necessarily advance only on the light extraction surface, but advances in the opposite direction, namely, in the direction toward the substrate 121. The fluorescent light source device 100 is also provided with layers for reflection (123, 124, 125) so as to effectively extract this fluorescence 132 as well. Among these layers, the reflection layer 123 is provided so as to direct the fluorescence 132 having passed through the total reflection layer 125 and the enhanced reflection layer 124 and advanced on the side of the substrate 121 toward the side of the light extraction surface, and is configured by a layer having especially high reflectance. The reflection layer 123 can be formed of Ag or Al, and is generally formed of Ag, in particular.

For the purpose of increasing the intensity of the fluorescence emitted from the fluorescent light source device 100, the present inventors made the excitation light 131 enter the light emitting element 120 at an intensity higher than the intensity that is conventionally considered to be general. Then, the present inventors newly found that the illuminance maintenance factor of the light emitting element 120 rapidly decreases in comparison with the case where the excitation light 131 enters at a conventional intensity.

In light of the above problem, it is an object of the present invention to provide a light emitting element, and a fluorescent light source device capable of maintaining high fluorescent intensity over a long period.

Means for Solving the Problem

The light emitting element according to the present invention includes:

a substrate;

a reflection layer formed of a material containing Ag or Al, formed on the upper layer of the substrate;

a diffusion prevention layer formed of a layer at least part of which being crystallized, the diffusion prevention layer being formed in contact with a surface of the reflection layer on a side opposite to the substrate;

an enhanced reflection layer formed in contact with a surface of the diffusion prevention layer on a side opposite to the substrate; and a fluorescent body layer formed on the upper layer of the enhanced reflection layer.

The present inventors made the excitation light 131 having high intensity enter for a long time, and analyzed the conventional light emitting element 120 in the condition that the illuminance maintenance factor is decreased. It was found that a material layer that is different from that in an early stage invaded inside the enhanced reflection layer 124. This layer was analyzed, and it was found that the layer was formed of a material containing Ag. It was also found that the material containing Ag did not invade the bonding layer 122 side.

Next, the present inventors made the excitation light 131 having a conventional degree of intensity enter the conventional light emitting element 120 for an equivalent time. At this time, the illuminance maintenance factor of the light emitting element 120 little decreased, and invasion of the material containing Ag into the enhanced reflection layer 124 was not observed in analysis of the element.

From this result, the present inventors inferred that incidence of the excitation light 131 having a very high intensity and the fluorescence 132 generated in the fluorescent body layer 126 into the reflection layer 123 resulted in diffusion of the Ag component contained in the reflection layer 123 only on the side of the light extraction surface for some reason, and invasion into the enhanced reflection layer 124. It is considered that the Ag component actually invaded as $Ag^+$, and precipitated as an Ag compound in the enhanced reflection layer 124. Presence of an Ag compound in the enhanced reflection layer 124 causes decrease in reflectance and transmittance in that region. Further, formation of an Ag compound containing a constituting element of the enhanced reflection layer 124 in a region neighboring the enhanced reflection layer 124 in the reflection layer 123 results in decrease in reflectance of the region. It is inferred that these phenomena caused decrease in illuminance maintenance factor.

By the way, it is conventionally known that Ag is easy to migrate by heat. However, even when the excitation light having high intensity is made to enter the light emitting element including a fluorescent layer, the temperature of the region of the reflection layer formed of a material containing Ag raises to about 100° C. to 200° C. at most, and it has been considered that migration little occurs at such a temperature. Since a light emitting element having high heat discharge property has been realized by recent technological innovation, it has been considered that the problem of migration has been already solved.

If migration occurs in a temperature environment of about 100° C. to 200° C., the Ag component should diffuse also in the direction of the substrate 121. However, as described above, it was found that the material containing Ag does not invade on the bonding layer 122 side. From this result, the inventors inferred that the Ag component diffused on the light extraction surface side by a mechanism that is different from migration by heat as is conventionally known. Although this mechanism is not certain at present, the present inventors consider as follows.

The intense excitation light 131 irradiating the fluorescent body layer 126, and the fluorescence 132 generated in the fluorescent body layer 126 by excitation by the excitation light 131 partly advance in the direction of the substrate 121. Of this light, the light having passed through the enhanced reflection layer 124 enters a surface of the reflection layer 123. Among the layers of the enhanced reflection layer 124, when the layer located closest to the reflection layer 123 (hereinafter, referred to as "specific layer") is amorphous, electron-hole pairs are generated in the layer by the intense excitation light 131 and the fluorescence 132.

Then, electrons of the metal atoms constituting the reflection layer 123 in contact with the specific layer are ionized by being captured by holes generated in the specific layer, and metal ions are generated. Since there are a large number of dangling bonds in the amorphous layer, the metal ions are attracted by the dangling bonds, and diffused in the enhanced reflection layer 124.

In contrast to this, according to the light emitting element according to the present invention, a diffusion prevention layer configured by a layer that is at least partly crystallized is formed between the reflection layer and the enhanced reflection layer. The diffusion prevention layer is configured to have high density, and contains less dangling bonds compared with the amorphous layer. This prevents diffusion of atoms of metal atoms constituting the reflection layer on the light extraction surface side from the diffusion prevention layer. Accordingly, even when intense excitation light enters the light emitting element, it is possible to maintain the high illuminance for a long time. The same effect is realized not only in the case where the reflection layer is formed of Ag or metal containing Ag, but also in the case where the reflection layer is formed of Al or metal containing Al.

Likewise the configuration shown in FIG. 9, a total reflection layer may be provided between the enhanced reflection layer and the fluorescent body layer.

According to the above consideration, it is preferred that the diffusion prevention layer be configured to have high density. For example, the diffusion prevention layer has a density of preferably more than 3.82 g/cm$^3$, more preferably 3.92 g/cm$^3$ or more. This point will be described later in "MODE FOR CARRYING OUT THE INVENTION".

The diffusion prevention layer can be configured by an oxide layer, a nitride layer, or a fluoride layer. Examples of the oxide layer include $Al_2O_3$, $SiO_2$, $TiO_2$, $Ta_2O_5$, $ZrO_2$, and $Nb_2O_5$. Examples of the nitride layer include SiN. Examples of the fluoride layer include $MgF_2$ and $CaF_2$. Among these, from the viewpoint of maintaining the high adhesiveness between neighboring layers, it is preferred to configure the diffusion prevention layer by an oxide layer. Further, from the viewpoint of realizing high adhesiveness, high light transmittance, and high crystallinity, and ease of deposition, it is preferred to configure the diffusion prevention layer by $TiO_2$.

The fluorescent light source device according to the present invention includes:

the light emitting element; and an excitation light source that irradiates a first surface on a farther side from the substrate of surfaces of the fluorescent body layer with excitation light, the fluorescent body layer radiating fluorescence having a longer wavelength than the excitation light from the first surface upon incidence of the excitation light.

According to the above configuration, a fluorescent light source device capable of maintaining high fluorescent intensity for a long time is realized.

Effect of the Invention

According to the present invention, a light emitting element and a fluorescent light source device capable of maintaining high fluorescent intensity for a long time is realized.

MODE FOR CARRYING OUT THE INVENTION

Referring to drawings, configurations of the light emitting element and the fluorescent light source device of the present invention will be described. In each of the following drawings, the depicted dimensional ratio is not necessarily coincident with the actual dimensional ratio.

[Configuration]

Figure 1:
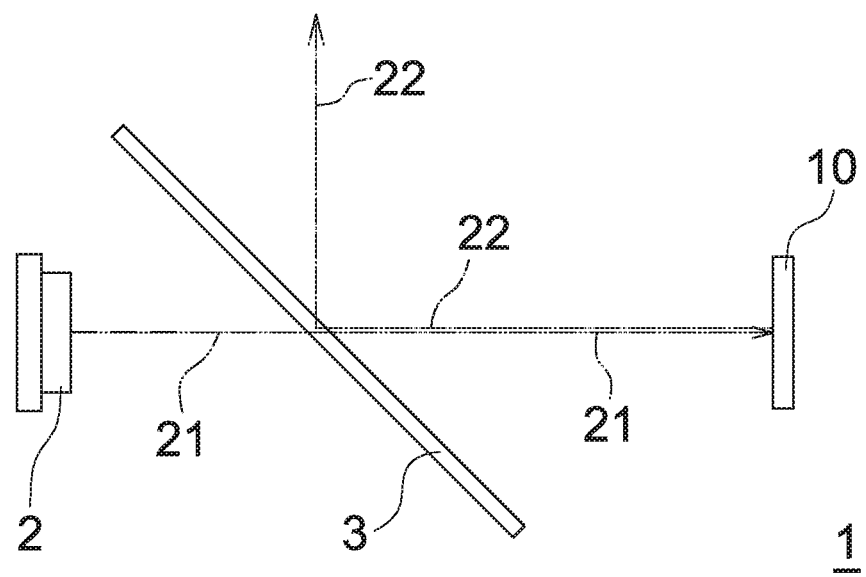
FIG. 1 is a view schematically showing a configuration of one embodiment of a fluorescent light source device.

FIG. 1 is a view schematically showing a configuration of one embodiment of a fluorescent light source device. A fluorescent light source device 1 shown in FIG. 1 includes an excitation light source 2, a dichroic mirror 3, and a light emitting element 10.

The excitation light source 2 includes a semiconductor laser device that emits light in the blue region having a wavelength of 445 nm or more and 465 nm or less, for example. The excitation light source 2 may include an optical system such as a collimator lens as necessary.

The light emitting element 10 includes a fluorescent body as will be described later. When the light emitting element 10 is irradiated with excitation light 21 emitted from the excitation light source 2, the fluorescent body included in the light emitting element 10 is excited, and fluorescence 22 is radiated from the light emitting element 10. The fluorescence 22 is light having a longer wavelength than the excitation light 21, and has a wavelength of 470 nm or more and 700 nm or less, for example.

In the fluorescent light source device 1 shown in FIG. 1, the dichroic mirror 3 is configured to transmit the excitation light 21 emitted from the excitation light source 2, while reflecting the fluorescence 22 emitted from the light emitting element 10. The dichroic mirror 3 is arranged so that the mirror surface is inclined at an angle of 45° to the incidence angle of the excitation light 21, for example. With such a configuration, the fluorescence 22 is extracted outside the fluorescent light source device 1, and enters a subsequent optical system (not shown), for example.

The optical arranging method of the fluorescent light source device 1 including the dichroic mirror 3 as shown in FIG. 1 is merely one example, and any arrangement form is possible.

Figure 2:
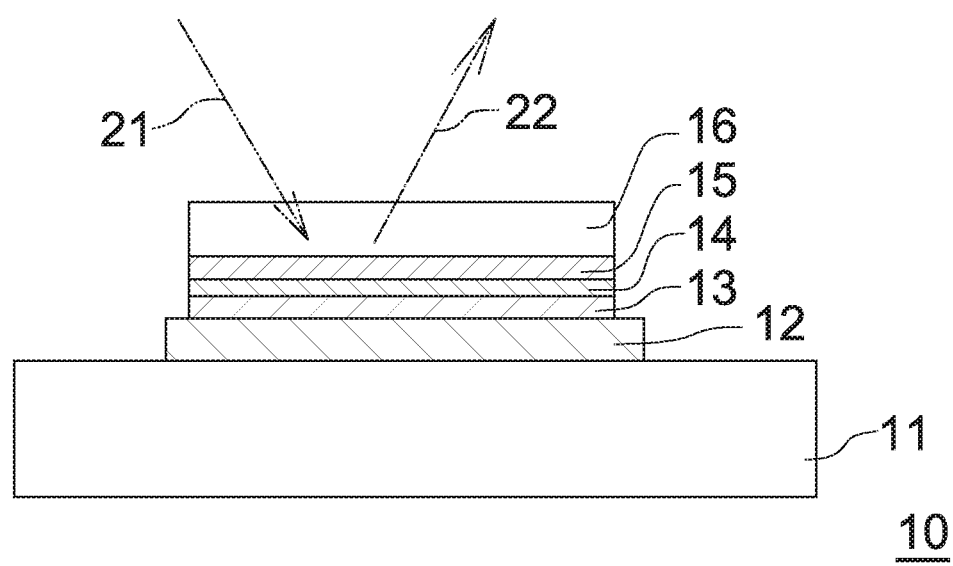
FIG. 2 is a sectional view schematically showing a configuration of a light emitting element.

FIG. 2 is a sectional view schematically showing a configuration of the light emitting element 10. As shown in FIG. 2, the light emitting element 10 has a substrate 11, a bonding layer 12, a reflection layer 13, a diffusion prevention layer 14, an enhanced reflection layer 15, and a fluorescent body layer 16.

(Substrate 11)

The substrate 11 is provided for supporting the fluorescent body layer 16 and discharging the heat emitted in the fluorescent body layer 16. The substrate 11 is formed of a material having a thermal conductivity of 90 W/(m·K) or more, specifically, 230 to 400 W/(m·K), for example. Examples of such a material include Cu, copper compounds (MoCu, CuW and the like), and Al.

The thickness of the substrate 11 is, for example, 0.5 to 5 mm From the viewpoint of heat discharge property or the like, it is preferred that the area in the surface of the substrate 11 be larger than the area of the fluorescent body layer 16.

(Bonding Layer 12)

The bonding layer 12 is a layer for bonding the substrate 11, and other layer including the fluorescent body layer 16, and is formed, for example, of a solder material. From the viewpoint of heat discharge property or the like, it is preferred to use, for example, a material having a thermal conductivity of 40 W/(m·K) or more as a material forming the bonding layer 12. More specifically, for example, a cream solder prepared by mixing flux and other impurities with a material such as Sn, Pb and the like to give a creamy (pasty) state, an Sn—Ag—Cu solder, an Au—Sn solder and the like can be used. The thickness of the bonding layer 12 is, for example, 20 to 200 μm.

Although not illustrated, from the viewpoint of further improving the bonding property between the substrate 11 and the bonding layer 12, a metal film of a Ni/Au film formed, for example, by plating may be formed between the substrate 11 and the bonding layer 12. The thickness of the metal film can be, for example, Ni/Au=1000 to 5000 nm/30 to 1000 nm.

(Reflection Layer 13)

The reflection layer 13 is formed on the upper layer of the bonding layer 12. The reflection layer 13 is provided for reflecting fluorescence that has advanced on the surface opposite to the light extraction surface (on the substrate 11 side) of the fluorescent body layer 16 of the fluorescence 22 generated in the fluorescent body layer 16, and guiding the fluorescence to the light extraction surface side. The reflection layer 13 is formed of a material having high reflectance (for example, 70% or more) for the fluorescence 22 generated in the fluorescent body layer 16, and is formed, for example, of metal consisting of Al or Ag, or a material film containing the metal. Preferably, the reflection layer 13 is formed of Ag. The thickness of the reflection layer 13 is, for example, 100 nm or more and 200 nm or less, and more preferably 120 nm or more and 180 nm or less.

Although not illustrated, from the viewpoint of further improving the adhesiveness between the reflection layer 13 and the substrate 11, a metal film of a Ni/Pt/Au film or a Ni/Au film, formed, for example, by vapor deposition may be formed on a surface of the reflection layer 13 on the substrate 11 side. The thickness of the metal film can be, for example, Ni/Pt/Au=30 nm/500 nm/500 nm.

(Diffusion Prevention Layer 14)

The diffusion prevention layer 14 is located between the reflection layer 13 and the enhanced reflection layer 15, and is formed in contact with a surface of the reflection layer 13 on the side opposite to the substrate 11. The diffusion prevention layer 14 is formed of a layer that is at least partly crystallized, and is not amorphous. The diffusion prevention layer 14 may be formed of a layer that is completely crystallized in the overall region.

As a method for analyzing the condition of crystallization of the diffusion prevention layer 14, for example, a reflection high energy electron diffraction (RHEED) can be recited. A reflection high energy electron diffraction image of the diffusion prevention layer 14 that is partly crystallized shows a ring-like or a dotted pattern according to the crystal orientation. On the other hand, a reflection high energy electron diffraction image of an amorphous layer shows a halo-like (blurred ring-like) pattern. Therefore, the condition of the crystallization can be recognized according to the difference in shape of the reflection high energy electron diffraction image of the objective layer.

In the present embodiment, the diffusion prevention layer 14 is formed of $TiO_2$ that is at least partly crystallized. At least partial crystallization realizes the high density of the diffusion prevention layer 14. Specifically, the density of the diffusion prevention layer 14 is higher than 3.82 g/cm$^3$, preferably 3.92 g/cm$^3$ or more. The density of the diffusion prevention layer 14 can be determined from the relation between the refractive index and the density. The relation between the refractive index and the density is generally represented as a Lorentz equation, and is represented by the equation of $r=[(n^2-1)/(n^2+2)] \times (M/RD)$, wherein r (g/cm$^3$) represents a density, n represents a refractive index, M represents a molecular weight (g/mol), and RD represents a molar reflective index (cm$^3$/mol).

The diffusion prevention layer 14 is not limited to $TiO_2$, but may be formed of an oxide layer formed of $Al_2O_3$, $SiO_2$, $Ta_2O_5$, $ZrO_2$, or $Nb_2O_5$ and the like, a nitride layer formed of SiN or the like, or a fluoride layer formed of $MgF_2$, $CaF_2$ or the like. However, from the viewpoint of ensuring high adhesiveness with respect to the reflection layer 13 and the enhanced reflection layer 15, it is preferred that the diffusion prevention layer 14 be formed of an oxide layer. Further, from the viewpoint of ease of deposition of a layer having high crystallinity, it is particularly preferred that the diffusion prevention layer 14 be formed of $TiO_2$.

Formation of the diffusion prevention layer 14 that is at least partly crystallized can be realized by an EB-IAD method in which vapor deposition is conducted under irradiation with argon ion, for example. In general, for deposition of $TiO_2$, vapor deposition using the EB method is generally used, and in this case, the deposited $TiO_2$ is amorphous.

The thickness of the diffusion prevention layer 14 is for example, 5 nm or more and 200 nm or less, more preferably 50 nm or more and 100 nm or less.

(Enhanced Reflection Layer 15)

Figure 3:
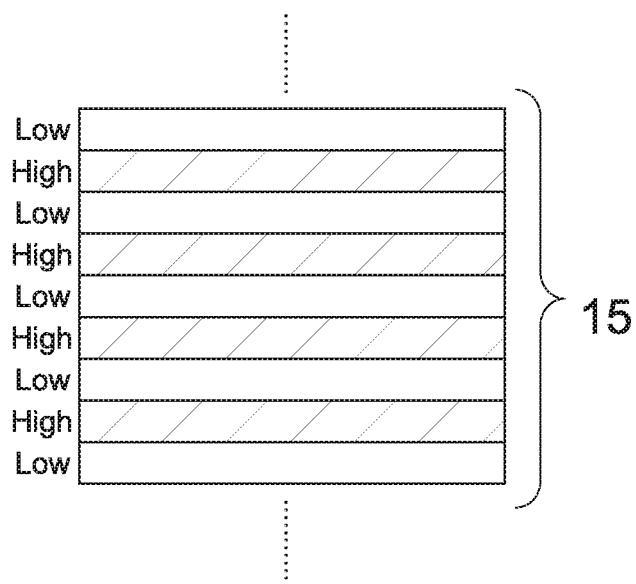
FIG. 3 is a sectional view schematically showing a configuration of an enhanced reflection layer.

The enhanced reflection layer 15 is formed in contact with a surface of the diffusion prevention layer 14 on the side opposite to the substrate 11. As shown in FIG. 3, the enhanced reflection layer 15 is an optical multilayer film in which a low refractive index material layer (Low) and a high refractive index material layer (High) are alternately laminated. The thickness of each layer constituting the enhanced reflection layer 15 is about ¼ of the wavelength of the fluorescence 22, and is, for example, 5 nm or more and 200 nm or less, more preferably 50 nm or more and 100 nm or less. The overall thickness of the enhanced reflection layer 15 is 10 nm or more and 500 nm or less, more preferably 50 nm or more and 200 nm or less.

As a low refractive index material constituting the enhanced reflection layer 15, for example, $SiO_2$ (refractive index n=1.45), $Al_2O_3$ (refractive index n=1.63) or the like can be used. As a high refractive index material constituting the enhanced reflection layer 15, for example, $TiO_2$ (refractive index n=2.35), $Nb_2O_5$ (refractive index n=2.37) or the like can be used. By sequentially depositing these materials by sputtering, vacuum vapor deposition or the like method, the enhanced reflection layer 15 is formed.

The layer constituting the enhanced reflection layer 15 may be amorphous, or at least partly crystallized. It suffices that the enhanced reflection layer 15 is provided with at least one low refractive index material layer and at least one high refractive index material layer, and the lamination may be repeated two or more times. When the low refractive index material layer and the high refractive index material layer are laminated repeatedly, the film thickness of each low refractive index material layer and the film thickness of each high refractive index material layer are not necessarily identical.

(Fluorescent Body Layer 16)

The fluorescent body layer 16 is formed on the upper layer of the enhanced reflection layer 15. Upon incidence of the excitation light 21 emitted from the excitation light source 2, the fluorescent body layer 16 generates and radiates fluorescence 22. The fluorescent body layer 16 assumes a rectangular plate-like structure, as one example. The thickness of the fluorescent body layer 16 is, for example, 0.05 to 1 mm.

The fluorescent body layer 16 includes a fluorescent body. More specifically, the fluorescent body layer 16 is formed of a monocrystalline or polycrystalline fluorescent body, or a sintered body of a mixture of the fluorescent body and a ceramic binder. That is, the fluorescent body layer 16 is formed of a monocrystalline or polycrystalline fluorescent body.

In the sintered body of a mixture of a fluorescent body and a ceramic binder used in the fluorescent body layer 16, for example, alumina particles of nano size are used as the ceramic binder. Then the sintered body can be obtained by mixing several % by mass to several tens % by mass of a ceramic binder with respect to 100% by mass of a fluorescent body, and pressing the mixture, followed by sintering.

When the fluorescent body layer 16 is formed of a monocrystalline fluorescent body, for example, the fluorescent body can be obtained by the Czochralski method. To be more specific, a seed crystal is brought into contact with a material in a crucible, and in this condition, the seed crystal is pulled up in the vertical direction while the seed crystal is rotated to cause growth of a single crystal, and thus a fluorescent body of single crystal is obtained.

When the fluorescent body layer 16 is formed of a polycrystalline fluorescent body, for example, the fluorescent body can be obtained, for example, in the following manner First, raw materials such as a base material, an activating material and a baking auxiliary agent are ground by a ball mill or the like, to obtain raw material microparticles of submicron or smaller. Then, using the raw material microparticles, a molded body is formed, for example by a slip cast method, and sintered. Then, the obtained sintered body is subjected to a hot hydrostatic pressure process to obtain a polycrystalline fluorescent body having a porosity of, for example, 0.5% or less.

As the fluorescent body constituting the fluorescent body layer 16, specifically, a YAG fluorescent body doped (activated) with a rare earth compound can be used. In such a fluorescent body, the doping amount of the rare earth element (activating agent) can be about 0.5 mol %. Examples of the rare earth compound include Ce, Pr, and Sm. Concrete examples of the fluorescent body include YAG:Ce, YAG:Pr, YAG:Sm, and LuAG:Ce. The fluorescent body layer 16 may contain a metal compound in the fluorescent body.

[Verification]

Hereinafter, the effect by the light emitting element 1 of the present embodiment is shown by referring to Examples and Comparative Examples. The element corresponding to the above-described configuration of the light emitting element 10 is referred to as Example 1. In Example 1, the diffusion prevention layer 14 is formed of $TiO_2$ that is at least partly crystallized, and has a density of 3.92 $g/cm^3$ and a refractive index of 2.45. The enhanced reflection layer 15 is formed of a multilayer film including a plurality of sets of layers of $SiO_2/TiO_2$. The layers constituting the enhanced reflection layer 15 are amorphous.

(Verification 1)

Figure 4:
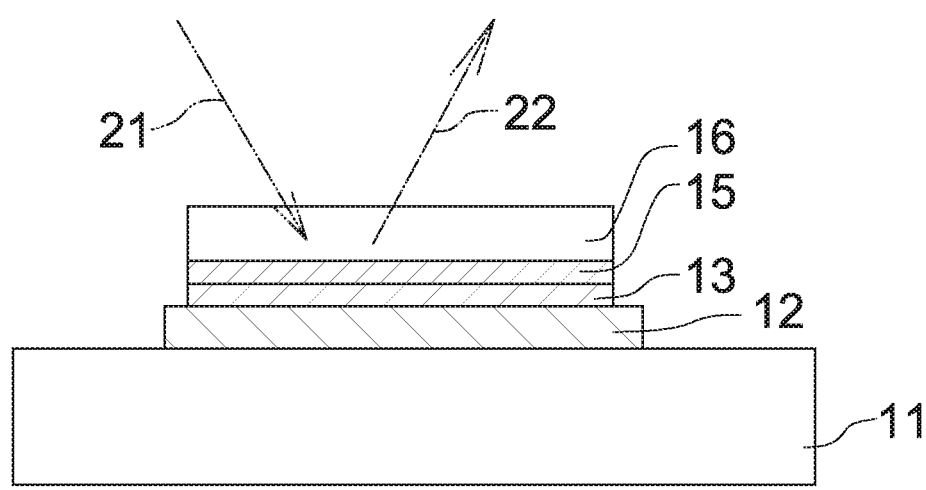
FIG. 4 is a sectional view schematically showing a configuration of a light emitting element of Comparative Example 1.

FIG. 4 is a view schematically showing a configuration of Comparative Example 1. Comparative Example 1 differs from Example 1 in that the diffusion prevention layer 14 is not provided. The reflection layer 13 is in contact with the enhanced reflection layer 15. More specifically, the $SiO_2$ layer included in the enhanced reflection layer 15 is in contact with the reflection layer 13. The $SiO_2$ layer has a density of 2.2 $g/cm^3$ and a refractive index of 1.45.

Figure 5:
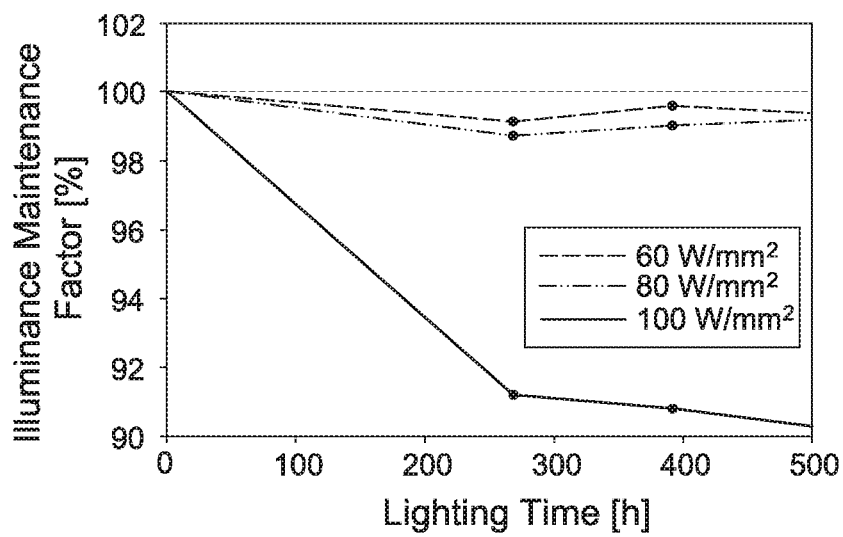
FIG. 5 is a graph showing variation in illuminance when the element of Comparative Example 1 is irradiated with excitation light.

FIG. 5 is a graph showing variation in illuminance when the element of Comparative Example 1 is irradiated with the excitation light 21 emitted from the excitation light source 2. In FIG. 5, three sets of data obtained by varying the maximum power density of the excitation light 21 are shown. The maximum power density refers to the power density of the part where the power is the greatest on the surface of the fluorescent body layer 16 irradiated with the excitation light 21. In FIG. 5, three cases where the maximum power density of the excitation light 21 is 60 $W/mm^2$, 80 $W/mm^2$, and 100 $W/mm^2$, respectively.

In FIG. 5, the horizontal axis indicates continuous irradiation time of the excitation light 21, and the vertical axis indicates the illuminance maintenance factor. The illuminance maintenance factor refers the rate of illuminance relative to the illuminance in the initial stage of irradiation with the excitation light 21 in each element.

Figure 6:
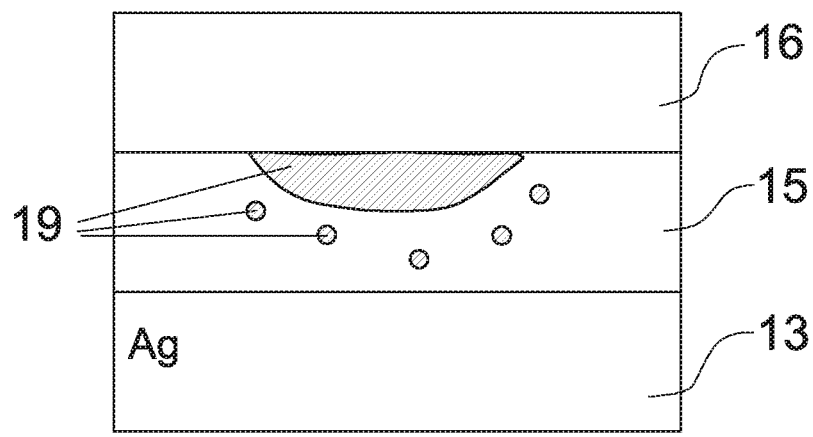
FIG. 6 is a sectional view schematically showing the appearance when the element of Comparative Example 1 is irradiated with excitation light having high intensity for a predetermined time.

According to FIG. 5, it is found that the illuminance maintenance factor drastically decreases in the case of a maximum power density of 100 W/mm$^2$, as compared with the cases of 60 W/mm$^2$, and 80 W/mm$^2$. As a result of analysis made by the present inventors, it was found that in the element of Comparative Example 1 after irradiation for 270 hours with the excitation light 21 having a maximum power density of 100 W/mm$^2$, a material layer 19 that is different from the material constituting the enhanced reflection layer 15 precipitated in the enhanced reflection layer 15 as schematically shown in FIG. 6. As a result of more specific investigation, it was confirmed that the material layer 19 is formed of a material containing Ag.

From this result, the present inventors inferred that by irradiation of the element of Comparative Example 1 with the excitation light 21 having a high power density, Ag which is a material constituting the reflection layer 13 diffuses on the enhanced reflection layer 15 side, and decreases the reflectance and the transmittance in the enhanced reflection layer 15, and thus the illuminance decreases, as described above in "MEANS FOR SOLVING THE PROBLEMS".

(Verification 2)

Figure 7:
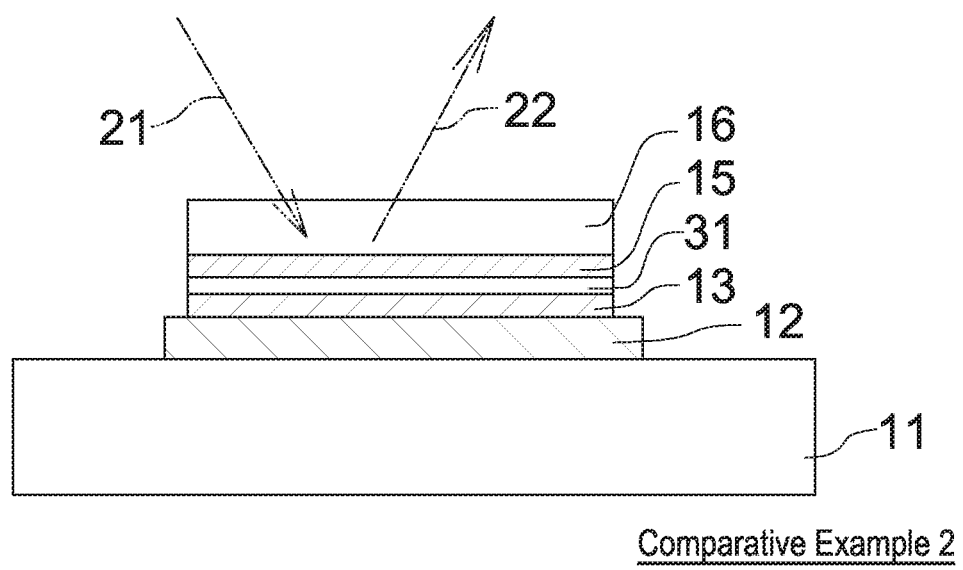
FIG. 7 is a sectional view schematically showing a configuration of a light emitting element of Comparative Example 2.

FIG. 7 is a view schematically showing a configuration of Comparative Example 2. Likewise Comparative Example 1, Comparative Example 2 does not have the diffusion prevention layer 14. Comparative Example 2 is different from Comparative Example 1 in that an Al$_2$O$_3$ layer 31 for improving the adhesiveness is provided between the enhanced reflection layer 15 and the reflection layer 13. The Al$_2$O$_3$ layer 31 is in contact with the SiO$_2$ layer contained in the enhanced reflection layer 15 and the reflection layer 13. The Al$_2$O$_3$ layer 31 has a density of 3.25 g/cm$^3$, and a refractive index of 1.63.

Figure 8:
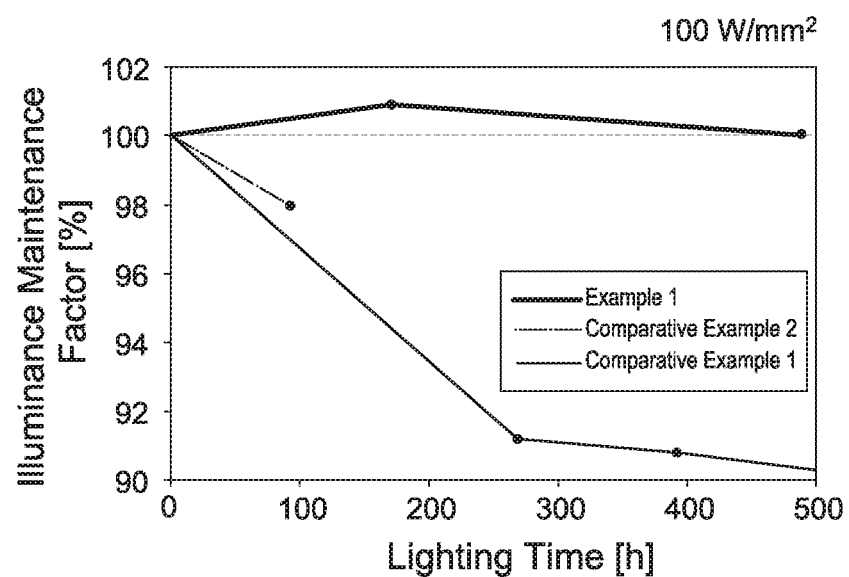
FIG. 8 is a graph showing variation in illuminance when each element of Comparative Example 1, Comparative Example 2, and Example 1 is irradiated with excitation light 21.
Figure 9:
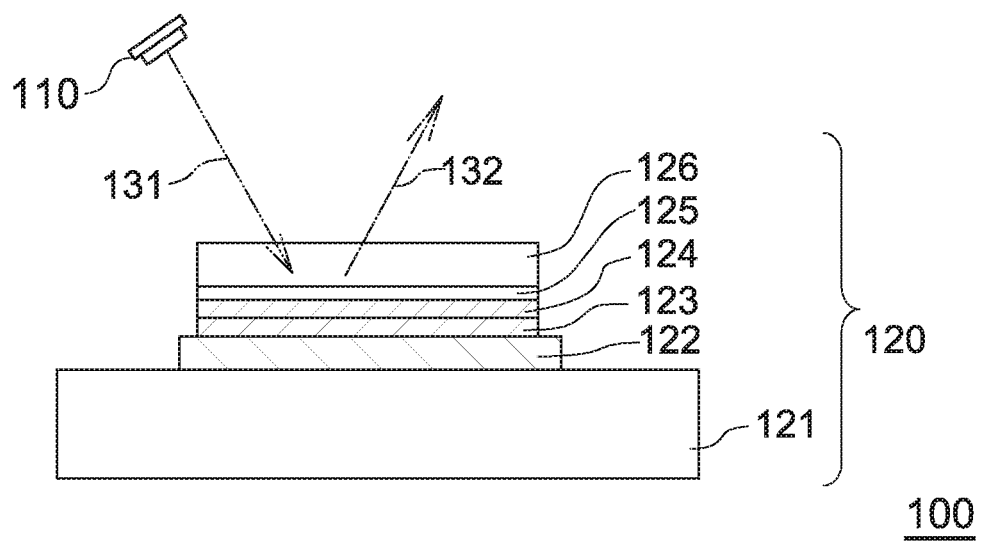
FIG. 9 is a view schematically showing a conventional fluorescent light source device.

FIG. 8 is a graph showing variation in illuminance when each element of Comparative Example 1, Comparative Example 2 and Example 1 is irradiated with the excitation light 21 emitted from the excitation light source 2 at a maximum power density of 100 W/mm$^2$. The data of Comparative Example 1 is the same as the data at 100 W/mm$^2$ in FIG. 5.

According to FIG. 8, also in the element of Comparative Example 2, it is found that the illuminance starts decreasing largely directly after start of the irradiation. More specifically, both in the element of Comparative Example 1 and the element of Comparative Example 2, it is found that the illuminance decreases to about 98% after a lapse of about 100 hours from start of illumination. In contrast to this, in the element of Example 1, it is found that approximately 100% of illuminance is maintained after a lapse of 500 hours.

While Comparative Example 2 lacks data after a lapse of 100 hours or more in FIG. 8, it is hard to imagine that the illuminance shows the rising trend after 100 hours or later, and it is expected that the illuminance continually decreases with the lapse of time by referring to the data of Comparative Example 1.

Although not shown in the graph, the same verification was conducted for the element in which the TiO$_2$ layer included in the enhanced reflection layer 15 is brought into contact with the reflection layer 13 in the element of Comparative Example 1 (hereinafter, referred to as "Comparative Example 3"), and also in this case, the illuminance maintenance factor decreased to about 98% after a lapse of about 100 hours as is the case with Comparative Example 1 or Comparative Example 2. The TiO$_2$ layer included in the enhanced reflection layer 15 is amorphous as described above, and has a density of 3.82 g/cm$^3$ and a refractive index of 2.35.

According to the above verification, in each of Comparative Examples 1 to 3, the density of the layer being in contact with the upper surface of the reflection layer 13 is low, and a large number of dangling bonds exist, so that Ag ions constituting the reflection layer 13 are attracted to the dangling bonds. This would result in diffusion of the material containing Ag in the enhanced reflection layer 15 to decrease the illuminance maintenance factor. On the other hand, according to the element of Example 1, since the diffusion prevention layer 14 having high density is in contact with the upper surface of the reflection layer 13, Ag ions cannot easily diffuse in the diffusion prevention layer 14, and this would result in prevention of advance into the enhanced reflection layer 15. The above verification reveals that the density of the diffusion prevention layer 14 formed in contact with the upper surface of the reflection layer 13 is preferably more than 3.82 g/cm$^3$, and more preferably 3.92 g/cm$^3$ or more.

According to the above verification result, the diffusion prevention layer 14 may be a layer having high crystallinity and high density, and more preferably a layer in a complete crystalline state. The diffusion prevention layer 14 realizes the function of preventing diffusion of Ag ions even when it is partly crystallized, in comparison with an amorphous layer. Therefore, it is possible to suppress decrease in illuminance in the case of irradiation with excitation light having high intensity.

In the above-described embodiment, the case where the reflection layer 13 is formed of Ag has been described, it is inferred that the effect is realized also in the case where the reflection layer 13 is formed of Al for the same reason. The same applies also to the case where the reflection layer 13 is formed of a metal material containing Ag, Al.

DESCRIPTION OF REFERENCE SIGNS

1 Fluorescent light source device
2 Excitation light source
3 Dichroic mirror
10 Light emitting element
11 Substrate
12 Bonding layer
13 Reflection layer
14 Diffusion prevention layer
15 Enhanced reflection layer
16 Fluorescent body layer
19 Material layer containing Ag
21 Excitation light
22 Fluorescence
31 Al$_2$O$_3$ layer
100 Conventional fluorescent light source device
110 Excitation light source
120 Conventional light emitting element
121 Substrate
122 Bonding layer
123 Reflection layer
124 Enhanced reflection layer
125 Total reflection layer
126 Fluorescent body layer 131 Excitation light
132 Fluorescence

The invention claimed is:

1. A light emitting element comprising:
   a substrate;
   a reflection layer formed of a material containing Ag or Al, formed on the upper layer of the substrate;
   a diffusion prevention layer formed of a layer at least part of which being crystallized, the diffusion prevention layer being formed in contact with a surface of the reflection layer on a side opposite to the substrate,
   an enhanced reflection layer formed in contact with a surface of the diffusion prevention layer on a side opposite to the substrate; and
   a fluorescent body layer formed on the upper layer of the enhanced reflection layer.

2. The light emitting element according to claim 1, wherein the diffusion prevention layer has a density of more than 3.82 g/cm$^3$.

3. A fluorescent light source device comprising:
   the light emitting element according to claim 2; and
   an excitation light source that irradiates a first surface on a farther side from the substrate of surfaces of the fluorescent body layer with excitation light, wherein
   the fluorescent body layer radiates fluorescence having a longer wavelength than the excitation light from the first layer upon incidence of the excitation light.

4. The fluorescent light source device according to claim 3, wherein the excitation light source is a light source capable of emitting the excitation light having a maximum power density on the first surface of 100 W/mm$^2$ or more.

5. The light emitting element according to claim 2, wherein the diffusion prevention layer is formed of an oxide layer.

6. A fluorescent light source device comprising:
   the light emitting element according to claim 5; and
   an excitation light source that irradiates a first surface on a farther side from the substrate of surfaces of the fluorescent body layer with excitation light, wherein
   the fluorescent body layer radiates fluorescence having a longer wavelength than the excitation light from the first layer upon incidence of the excitation light.

7. The fluorescent light source device according to claim 6, wherein the excitation light source is a light source capable of emitting the excitation light having a maximum power density on the first surface of 100 W/mm$^2$ or more.

8. The light emitting element according to claim 5, wherein the diffusion prevention layer is formed of TiO$_2$.

9. A fluorescent light source device comprising:
   the light emitting element according to claim 8; and
   an excitation light source that irradiates a first surface on a farther side from the substrate of surfaces of the fluorescent body layer with excitation light, wherein
   the fluorescent body layer radiates fluorescence having a longer wavelength than the excitation light from the first layer upon incidence of the excitation light.

10. The fluorescent light source device according to claim 9, wherein the excitation light source is a light source capable of emitting the excitation light having a maximum power density on the first surface of 100 W/mm$^2$ or more.

11. The light emitting element according to claim 8, wherein the diffusion prevention layer has a thickness of 5 nm or more and 200 nm or less.

12. A fluorescent light source device comprising:
    the light emitting element according to claim 11; and
    an excitation light source that irradiates a first surface on a farther side from the substrate of surfaces of the fluorescent body layer with excitation light, wherein
    the fluorescent body layer radiates fluorescence having a longer wavelength than the excitation light from the first layer upon incidence of the excitation light.

13. The fluorescent light source device according to claim 12, wherein the excitation light source is a light source capable of emitting the excitation light having a maximum power density on the first surface of 100 W/mm$^2$ or more.

14. A fluorescent light source device comprising:
    the light emitting element according to claim 1; and
    an excitation light source that irradiates a first surface on a farther side from the substrate of surfaces of the fluorescent body layer with excitation light, wherein
    the fluorescent body layer radiates fluorescence having a longer wavelength than the excitation light from the first surface upon incidence of the excitation light.

15. The fluorescent light source device according to claim 14, wherein the excitation light source is a light source capable of emitting the excitation light having a maximum power density on the first surface of 100 W/mm$^2$ or more.

* * * * *